(12) United States Patent
Tsukerman et al.

(10) Patent No.: US 8,415,632 B2
(45) Date of Patent: Apr. 9, 2013

(54) METHODS AND SYSTEMS FOR CALIBRATING A NUCLEAR MEDICINE IMAGING SYSTEM

(75) Inventors: Leonid Tsukerman, Q. Mozkin (IL); Floribertus P. M. Heukensfeldt Jansen, Ballston Lake, NY (US); Ira Blevis, Zichron Yaakov (IL); Jean-Paul Bouhnik, Zichron Yaacov (IL)

(73) Assignee: General Electric Company, Schenectady, NY (US)

( * ) Notice: Subject to any disclaimer, the term of this patent is extended or adjusted under 35 U.S.C. 154(b) by 370 days.

(21) Appl. No.: 12/720,451

(22) Filed: Mar. 9, 2010

(65) Prior Publication Data
US 2011/0220783 A1    Sep. 15, 2011

(51) Int. Cl.
*G01T 1/161* (2006.01)
(52) U.S. Cl. .................................. 250/363.09
(58) Field of Classification Search ............. 250/363.09
See application file for complete search history.

(56) References Cited

U.S. PATENT DOCUMENTS

| | | | |
|---|---|---|---|
| 4,424,446 A | 1/1984 | Inbar et al. | |
| 4,882,494 A * | 11/1989 | Rogers et al. | 250/363.09 |
| 5,512,755 A | 4/1996 | Vickers et al. | |
| 5,606,166 A * | 2/1997 | Tararine | 250/363.07 |
| 5,677,536 A | 10/1997 | Vickers | |
| 6,072,177 A | 6/2000 | McCroskey et al. | |
| 6,559,450 B1 | 5/2003 | Berlad et al. | |
| 6,787,786 B2 | 9/2004 | Kalas et al. | |
| 7,232,990 B2 | 6/2007 | Wang et al. | |
| 7,335,889 B2 | 2/2008 | Wang et al. | |
| 7,417,232 B2 | 8/2008 | Wang et al. | |

* cited by examiner

*Primary Examiner* — Constantine Hannaher
(74) *Attorney, Agent, or Firm* — The Small Patent Law Group; Dean D. Small (57) ABSTRACT

Methods and systems for calibrating a nuclear medicine imaging system are provided. One method includes acquiring spatially determined non-uniform radiation flux information from a calibration scan of a calibration source using a gamma camera having an attached non-parallel-hole collimator. The method further includes determining a measured non-uniform count density profile from the acquired non-uniform radiation flux information. The method also includes creating a gamma camera uniformity correction map derived from (i) the measured non-uniform count density profile and (ii) a modeled or calculated non-uniform count density profile for calibrating the NM imaging system.

20 Claims, 10 Drawing Sheets

METHODS AND SYSTEMS FOR CALIBRATING A NUCLEAR MEDICINE IMAGING SYSTEM

BACKGROUND OF THE INVENTION

The subject matter disclosed herein relates generally to nuclear medicine (NM) imaging systems, and more particularly to methods and systems for determining gamma camera uniformity correction for the NM imaging systems.

NM imaging systems, for example Single Photon Emission Computed Tomography (SPECT) and Positron Emission Tomography (PET) imaging systems, use one or more image detectors to acquire image data, such as gamma ray or photon image data. The image detectors may be gamma cameras that acquire two-dimensional views of three-dimensional distributions of emitted radionuclides (from an injected radioisotope) from a patient being imaged.

In single photon imaging systems, such a planar or SPECT imaging systems, collimators may be placed in front of a scintillation crystal or solid state detector to form an image of a radioactive source and to focus the field of view (FOV) of the detectors. The collimators allow gamma rays aligned with the holes of the collimators to pass through to the detector. These detectors need to be calibrated, including during system manufacture and periodically after installation to ensure proper imaging operation. For example, the detectors are calibrated to provide a uniform sensitivity response across the detector units or output channels.

Specifically, conventional gamma cameras for NM imaging systems with detachable or/and fixed parallel-hole collimators are usually calibrated using a uniform gamma flux from an emission source, which irradiates the detector component (exposes the detector to radioactive emissions) that is sensitive to gamma rays. The uniform gamma flux is usually created by a point source located a far distance from the detector with the collimator detached. Alternatively, a uniform flood source can be used for a detector equipped with an attached collimator.

During the calibration process, the detector response to uniform gamma flux is measured. The count density of the planar image is usually considered a measure of the detector response. Non-uniformity of the planar image count density is caused by variation of detector responses within a system. Accordingly, a gamma-camera uniformity correction map is derived from the acquired planar image count density data to correct for the non-uniformity, often referred to as sensitivity calibration.

If a gamma camera is equipped with a fixed non-parallel-hole collimator (e.g., pinhole, fan-beam, cone-beam collimator), which is not detachable, such as in some clinical conditions, then the requirement for detector irradiation to be a uniform gamma flux becomes very difficult or even impossible to implement.

BRIEF DESCRIPTION OF THE INVENTION

In accordance with various embodiments, a method for calibrating a nuclear medicine (NM) imaging system is provided. The method includes acquiring spatially determined non-uniform radiation flux information from a calibration scan of a calibration source using a gamma camera having an attached non-parallel-hole collimator. The method further includes determining a measured non-uniform count density profile from the acquired non-uniform radiation flux information. The method also includes creating a gamma camera uniformity correction map derived from (i) the measured non-uniform count density profile and (ii) a modeled or calculated non-uniform count density profile for calibrating the NM imaging system.

In accordance with other various embodiments, a method for generating a gamma-camera correction map is provided. The method includes acquiring non-uniform radiation flux information from a calibration scan of a calibration source from a gamma camera having a fixed non-parallel-hole collimator using a calibration source holder having a plurality of predetermined fixed calibration source positions and orientations. The method further includes determining a gamma-camera uniformity correction using (i) measured non-uniform gamma flux from the non-uniform radiation flux information and (ii) modeled or calculated non-uniform gamma flux. The method also includes creating the gamma-camera correction map from the measured non-uniform gamma flux and the modeled or calculated non-uniform gamma flux.

In accordance with yet other various embodiments, a nuclear medicine (NM) imaging system is provided that includes at least one gamma camera and a calibration source holder configured to position a calibration source in a plurality of positions and orientations relative to the gamma camera. The NM imaging system further includes a processor configured to determine a gamma-camera uniformity correction for the gamma camera using (i) measured non-uniform gamma flux from the gamma camera and (ii) modeled or calculated non-uniform gamma flux.

DETAILED DESCRIPTION OF THE INVENTION

The foregoing summary, as well as the following detailed description of certain embodiments will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (e.g., processors or memories) may be implemented in a single piece of hardware (e.g., a general purpose signal processor or random access memory, hard disk, or the like) or multiple pieces of hardware. Similarly, the programs may be stand alone programs, may be incorporated as subroutines in an operating system, may be functions in an installed software package, and the like. It should be understood that the various embodiments are not limited to the arrangements and instrumentality shown in the drawings.

As used herein, an element or step recited in the singular and proceeded with the word "a" or "an" should be understood as not excluding plural of said elements or steps, unless such exclusion is explicitly stated. Furthermore, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

Also as used herein, the phrase "reconstructing an image" is not intended to exclude embodiments in which data representing an activity distribution is generated, but a viewable image is not. Therefore, as used herein the term "image" broadly refers to both viewable images and data representing a viewable image. However, many embodiments generate, or are configured to generate, at least one viewable image.

Various embodiments provide systems and methods for calibrating a nuclear medicine (NM) imaging system, especially NM systems that include fixed non-parallel-hole collimators that are not readily detachable in clinical settings or under clinical conditions. For example, various embodiments provide a calibration source holder for acquiring non-uniform gamma flux information to be used to calibrate the detectors of the NM imaging system. The NM systems including fixed non-parallel-hole collimators may be any type of fixed non-parallel-hole collimators, such as pin-hole, fan-beam, astigmatic, varifocal and cone-beam types of non-parallel-hole collimators or combinations thereof. In general, the NM imaging system may include any type of non-parallel-hole collimators, for example, such as collimators formed from slits and/or slats.

By practicing at least some of the various embodiments, gamma-camera uniformity (sensitivity) correction is provided that compensates for detector inaccuracy in gamma flux measurement. A uniformity correction map is created based on irradiation of one or more detectors by non-uniform gamma flux. Thus, after the uniformity correction map is measured as a response to non-uniform gamma flux, the uniformity correction map is applied to, for example, clinical scans to compensate for the inaccuracy in measurement of gamma flux irradiated from a scanned object, such as a patient's body. Alternatively, the uniformity correction is used during the image reconstruction process as part of the detector sensitivity model, correcting for the detector sensitivity variations without directly modifying the clinical scan.

Figure 1:
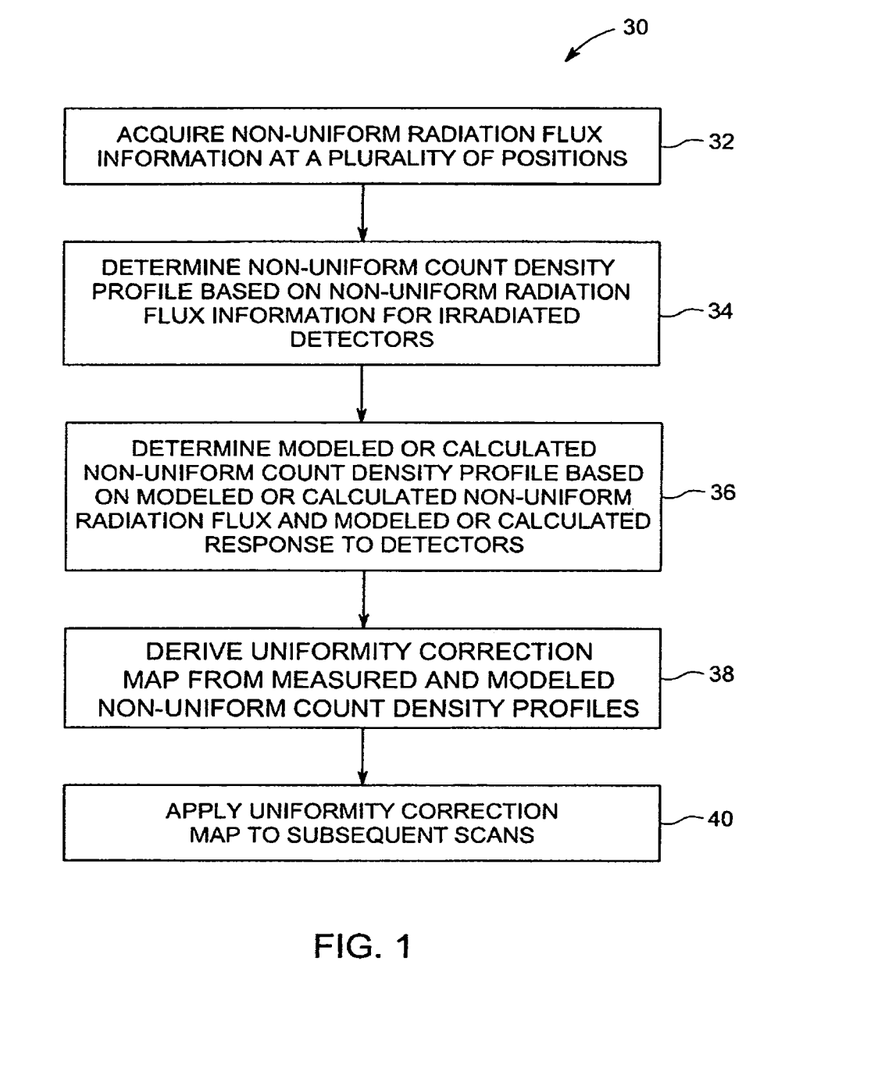
FIG. 1 is a flowchart of a method for calibrating a nuclear medicine (NM) imaging system in accordance with various embodiments.
Figure 2:
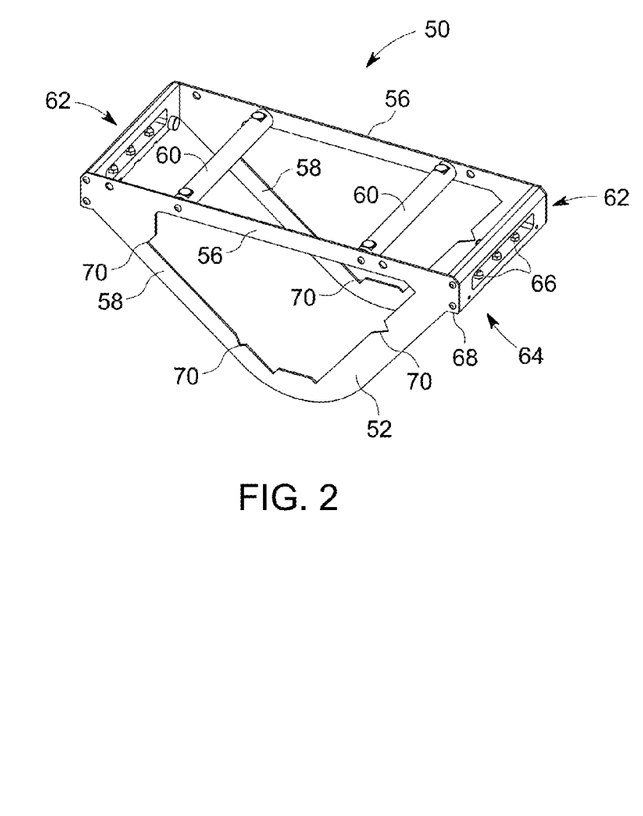
FIG. 2 is a perspective view of a calibration source holder formed in accordance with various embodiments.
Figure 3:
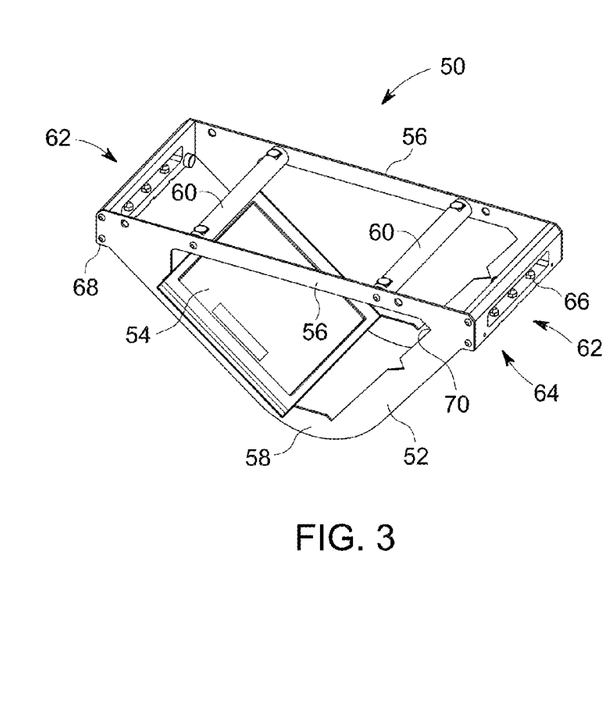
FIG. 3 is a perspective view of the calibration source holder of FIG. 2 illustrating one position of an emission source.
Figure 4:
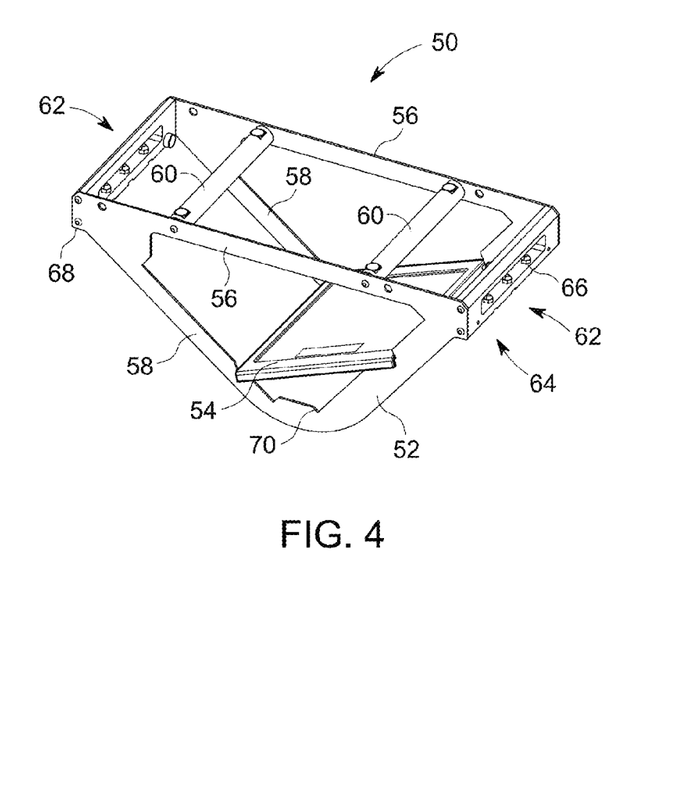
FIG. 4 is a perspective view of the calibration source holder of FIG. 2 illustrating another position of an emission source.
Figure 5:
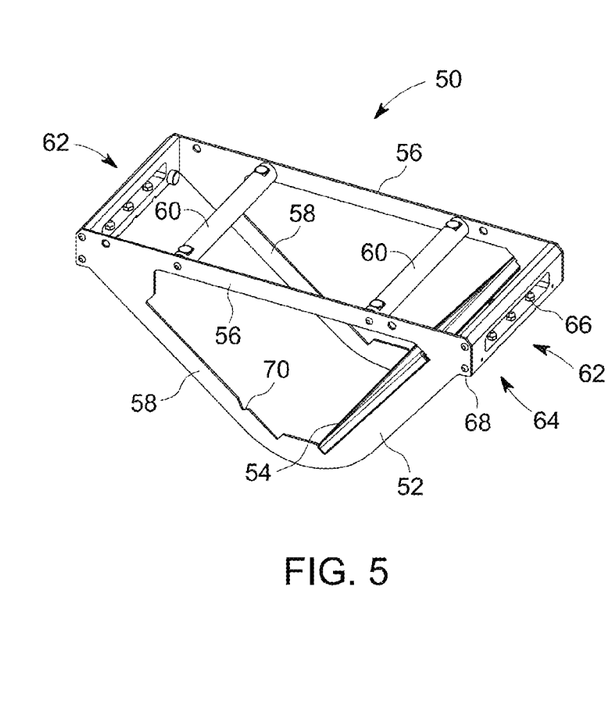
FIG. 5 is a perspective view of the calibration source holder of FIG. 2 illustrating another position of an emission source.

In particular, various embodiments provide a method 30 as shown in FIG. 1 for calibrating an NM imaging system wherein gamma-camera uniformity correction is created using (i) measured and (ii) modeled or calculated non-uniform gamma flux. Specifically, as illustrated in FIG. 1, non-uniform radiation flux information is acquired at 32. In some embodiments, the non-uniform radiation flux information is acquired at a plurality of positions using a calibration source holder that supports a calibration source (e.g., emission flood source). The calibration source holder may maintain the calibration source in a one of a plurality of pre-defined or predetermined positions and/or orientations. Thus, in some embodiments, a gamma-camera detector is irradiated by a calibration source positioned in a plurality of positions, which may be determined positions. In other embodiments as described in more detail herein, the source position is estimated to provide non-predetermined source positions for calibration.

In various embodiments, a calibration source holder 50 as shown in FIGS. 2 through 5 may be provided. However, as discussed in more detail herein, in other embodiments, the calibration source holder 50 is not used. The calibration source holder 50, when mounted to an imaging system, sets the source position and orientation of the calibration source relative to the detector component of the imaging system that is sensitive to gamma rays. In these positions, the calibration source creates spatially determined non-uniform gamma flux, which irradiates the detector component sensitive to gamma rays. Accordingly, the calibration source position and orientation geometry relative to camera detector are directed to provide irradiation of the entire detector component sensitive to gamma rays.

Figure 6:
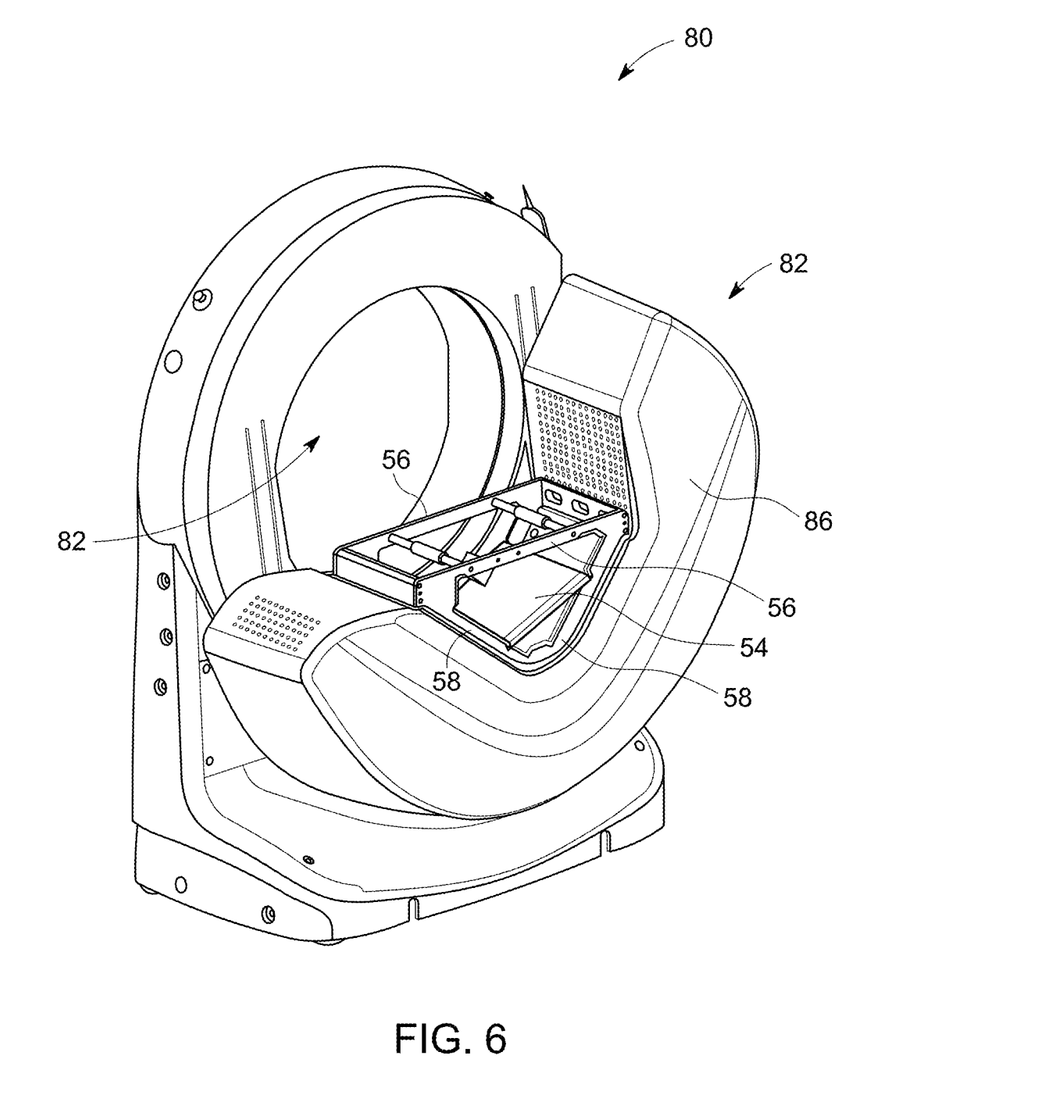
FIG. 6 is a perspective view of an NM imaging system in which various embodiments of a calibration source holder may be implemented.
Figure 7:
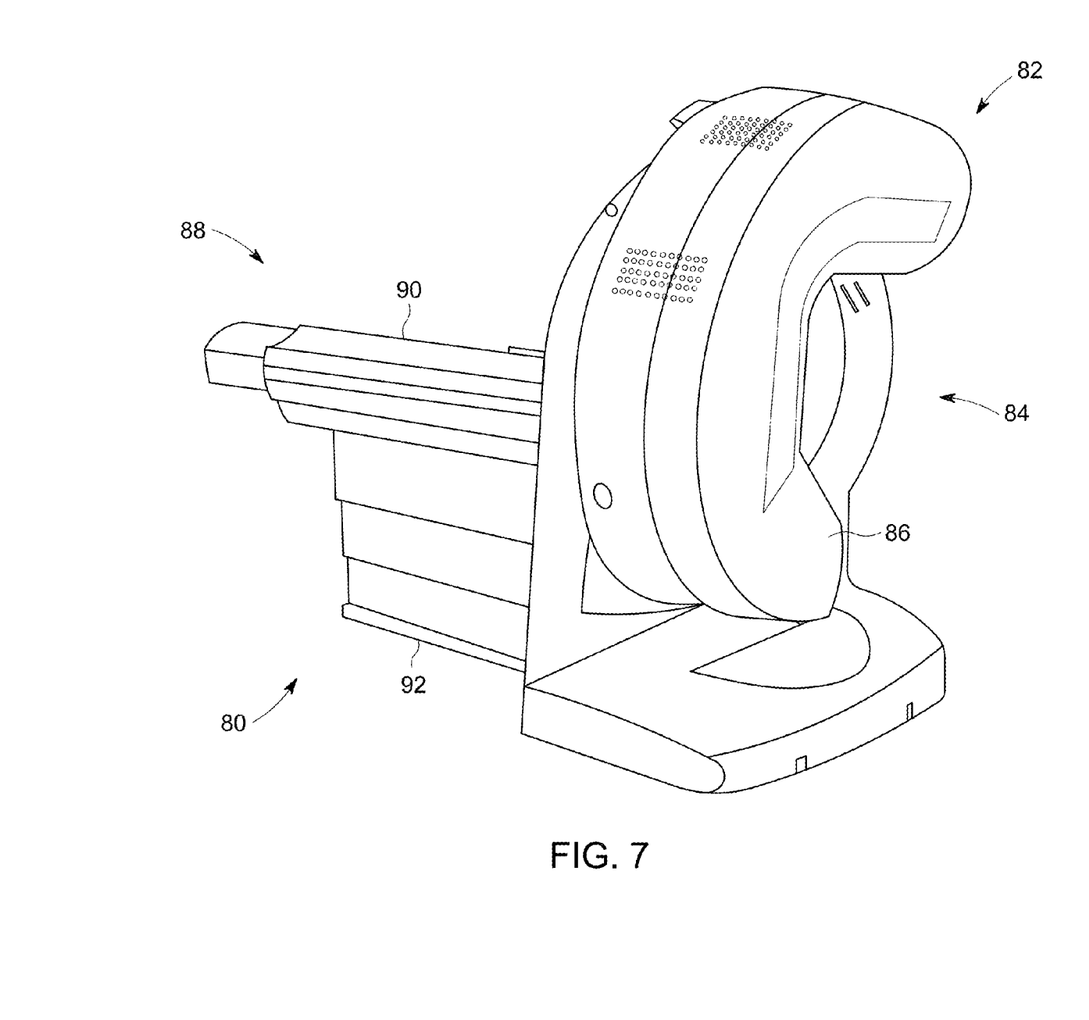
FIG. 7 is another perspective view of an NM imaging system in which various embodiments of a calibration source holder may be implemented.

The calibration source holder 50 may be configured as shown in FIGS. 2 through 5 for use in calibrating an imaging system, for example, the NM imaging system 80 as shown in FIGS. 6 and 7. Specifically, as shown in FIGS. 2 through 5, the calibration source holder 50 may include a support member 52, illustrated as a frame and generally defining a jig for holding a calibration source 54 (shown in FIGS. 3 through 6) within a gantry 82 inside a bore 84 of the NM imaging system 80 (shown in FIGS. 6 and 7), and more particularly, supported against or along a detector assembly 86. The support member 52 is sized and shaped to fit within the gantry 82 inside the bore 84 and to encompass all or at least a portion of an inner circumference of the housing of the detector assembly 86, such as one-quarter, one-third, one-half, etc. of the detector assembly 86 to support the calibration source 54 in one of a plurality of fixed positions as described in more detail below.

For example, in the exemplary embodiment illustrated in FIG. 6, the support member 52 is sized and shaped to fit within the gantry 82 inside the bore 84 and to encompass the entire detecting area of the detector assembly 86 by moving the calibration source 54 to one of a plurality of positions.

The support member 52 includes legs 56 that are configured to extend across the diameter of the detector assembly 86 and legs 58 that extend along the circumference of the detector assembly 86. Cross-members 60 also may be provided, for example, transverse to the legs 56 and aligned axially along the housing of the detector assembly 86 to further support the calibration source holder 50.

Figure 8:
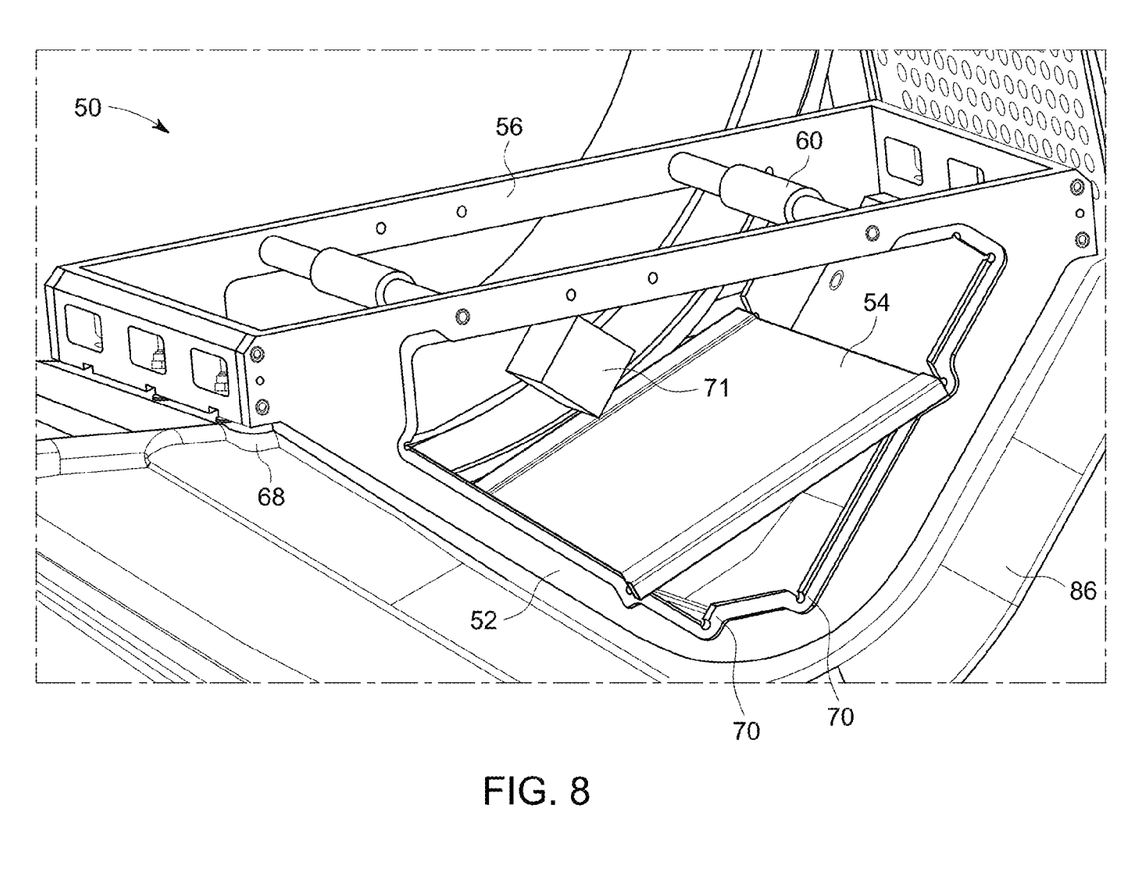
FIG. 8 is an enlarged view of the calibration source holder mounted to the NM imaging system of FIG. 6.

The calibration source holder 50 further includes mounting portions 62 that are generally defined by end frames having openings 64 therein. The openings 64 are sized and shaped to receive therethrough fastening members 66, illustrated as bolts that are used to secure the calibration source holder 50 to the detector assembly 86. Any type of fastening members 66 may be used, for example, screws or other securing members. The openings 64 are formed along a flat base 68 of the mounting portions 62 that abuts against a flat portion of the detector assembly 86 (as shown more clearly in FIG. 8). The openings 64 allow the fastening members 66 to pass through the mounting portions 62 and secure within the detector assembly 86, for example, threaded bores (not shown) of the detectors assembly 86.

The calibration source holder 50 also includes within each of the legs 58 a plurality of notches 70 spaced along the legs 58 to support the calibration source 54 in each of a plurality of fixed predetermined positions and/or orientations, such as in front of one or more gamma camera detectors and having a determined coordinate system (represented by the cube 71). The notches 70 are sized and shaped to support and maintain the position of the calibration source 54 within the calibration source holder 50 and relative to a predetermined location of the detector assembly 86, such as to irradiate an entire detector surface. The illustrated embodiments include six notches 70 on each of the legs 58 to support the calibration source 54 in one of three predetermined positions by supporting the ends of the calibration source 54. However, more or fewer notches 70 may be provided as desired or needed, for example, based on the size and number of detectors forming the detector assembly 86. It should be noted that the calibration source holder 50 may be formed in different configurations and arrangements, and is not limited to the structure shown in FIGS. 2 through 8. For example, the shape of any of the support legs may be changed to conform to the shape of a different detector assembly or different imaging system. Thus, a different calibration source holder 50 may be provided for each of a plurality of different systems or a single calibration source holder 50 may be provided for the different systems.

With the calibration source holder 50 supported within the detector assembly 86 as described and illustrated in more detail above, a scanning operation is then performed to acquire the non-uniform radiation flux information, which may include photon event count information from the calibration source 54, which is detected, for example, by each of a plurality of pixels of the detectors of the detector assembly 86. During scanning operation, the radiation emitted from the calibration source 54 passes through a collimation system of the NM imaging system and creates non-uniform radiation flux on the detector component(s) sensitive to gamma rays. It should be noted that the calibration source 54 may be any type of emission calibration source. For example, the calibration source 54 may be a uniform flood source manufactured from a radioisotope, for example, a uniform flood source manufactured from a Cobalt (Co) radioisotope, such as a $^{57}$Co radioisotope, a Technetium-99m (Tc-99m) radioisotope, among others.

Figure 9:
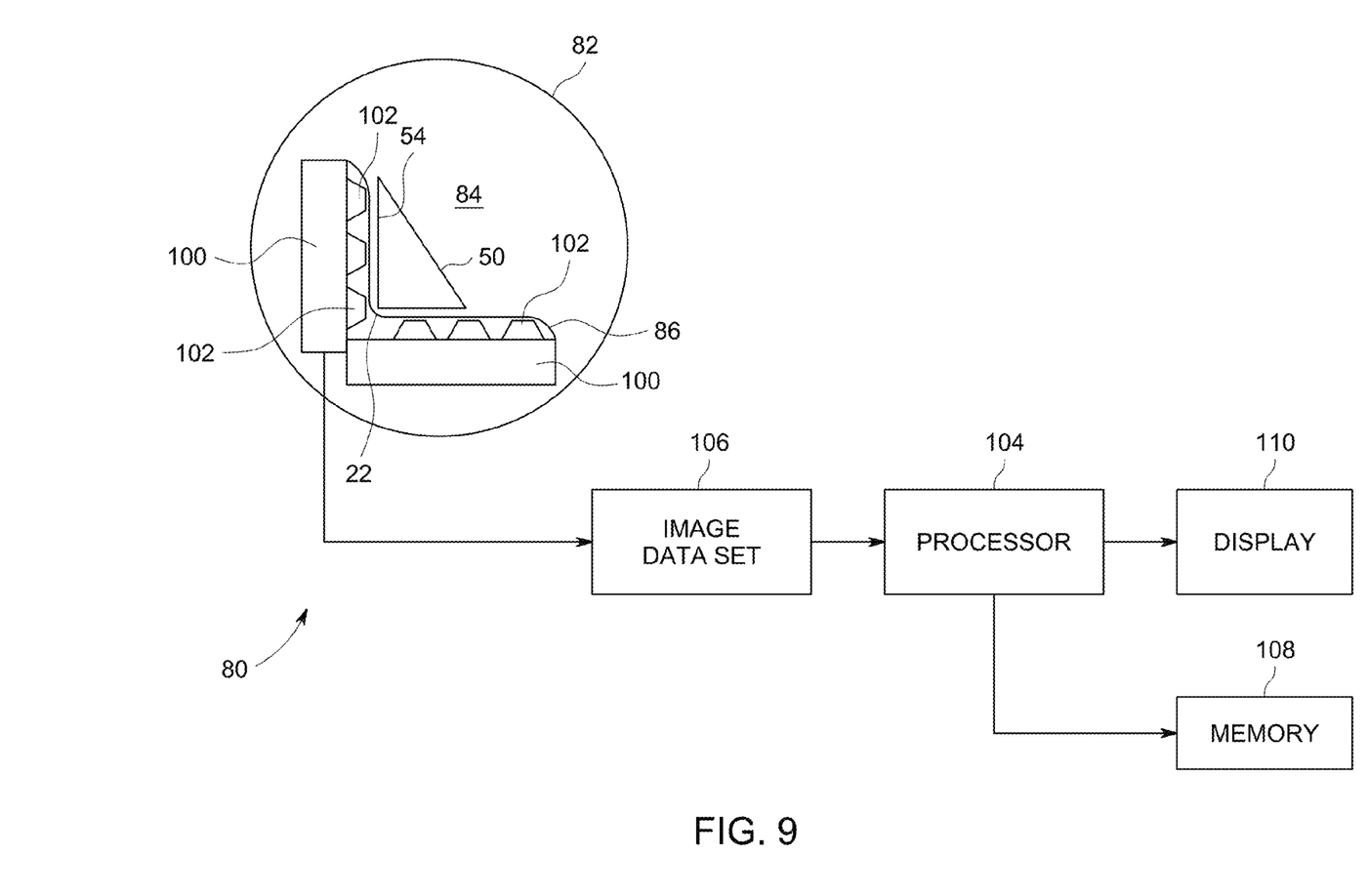
FIG. 9 is a block diagram illustrating an embodiment of the NM imaging system of FIG. 6 in which various embodiments of a calibration source holder may be implemented.

For example, as shown in FIG. 9, the NM imaging system 80 may include one or more detectors, such as a pair of detectors 100 (e.g., gamma detectors or gamma cameras) within the detector assembly 86 (such as housing thereof) and having the bore 84 therethrough. The bore 84 is configured to receive an object therein, such as a patient supported on a patient table 88 (shown in FIG. 7) or the calibration source holder 50 or a portion thereof. The detectors 100 are shown in an "L" mode configuration, but may be moved and positioned in other configurations such as an "H" mode configuration. Additionally, the gantry 82 may be configured in different shapes, for example, as a "C", "H" or "L". It should be noted that more or fewer detectors 100 may be provided.

The detectors 100 are supported on the gantry 82 to acquire NM data, such as emission photon data for determining uniformity correction information. The detectors 100 may be formed from different materials, such as cadmium zinc telluride (CdZnTe), often referred to as CZT, cadmium telluride (CdTe), and silicon (Si), among others, or from Sodium Iodide (NaI) and used in combination with photomultiplier (PMT) tubes (not shown) or from Cesium Iodide (CsI) in combination with photodiodes, or any other detector type, as is known. In some embodiments, the detectors may be formed from a plurality of detector modules, each having a plurality of pixels.

The collimation system generally includes one or more collimators 102 provided in combination with the detectors 100 (or modules thereof), for example, in front of the gamma ray sensitive surface, to provide focused collimation toward a region of interest (ROI). Thus, the actual field of view (FOV) for each of the detectors 100 (or portions thereof) may be decreased by the type of collimator, such as pinhole (or multi-pinhole) or converging collimator. Additionally, the actual FOV may be increased or remain relatively unchanged depending on the type of collimator 102 used. Examples of types of collimators 102 include fixed non-parallel-hole collimators, such as pin-hole, fan-beam (converging or diverging) and cone-beam (converging or diverging) types of non-parallel-hole collimators, astigmatic or varifocal collimators, among others. It should be noted that the collimation system may be a pinhole or multi-pinhole collimator system.

The non-uniform radiation flux is detected by one (or more) of the collimated detectors 100, which creates a non-uniform count density profile on a resulting image, which is referred to as the measured count profile. Accordingly, and referring again to FIG. 1, a non-uniform count density profile may be determined at 34 based on the non-uniform radiation flux information for the irradiated detectors, namely the emission of gamma rays or photons from the calibration source 54 and through the collimators 102.

Figure 10:
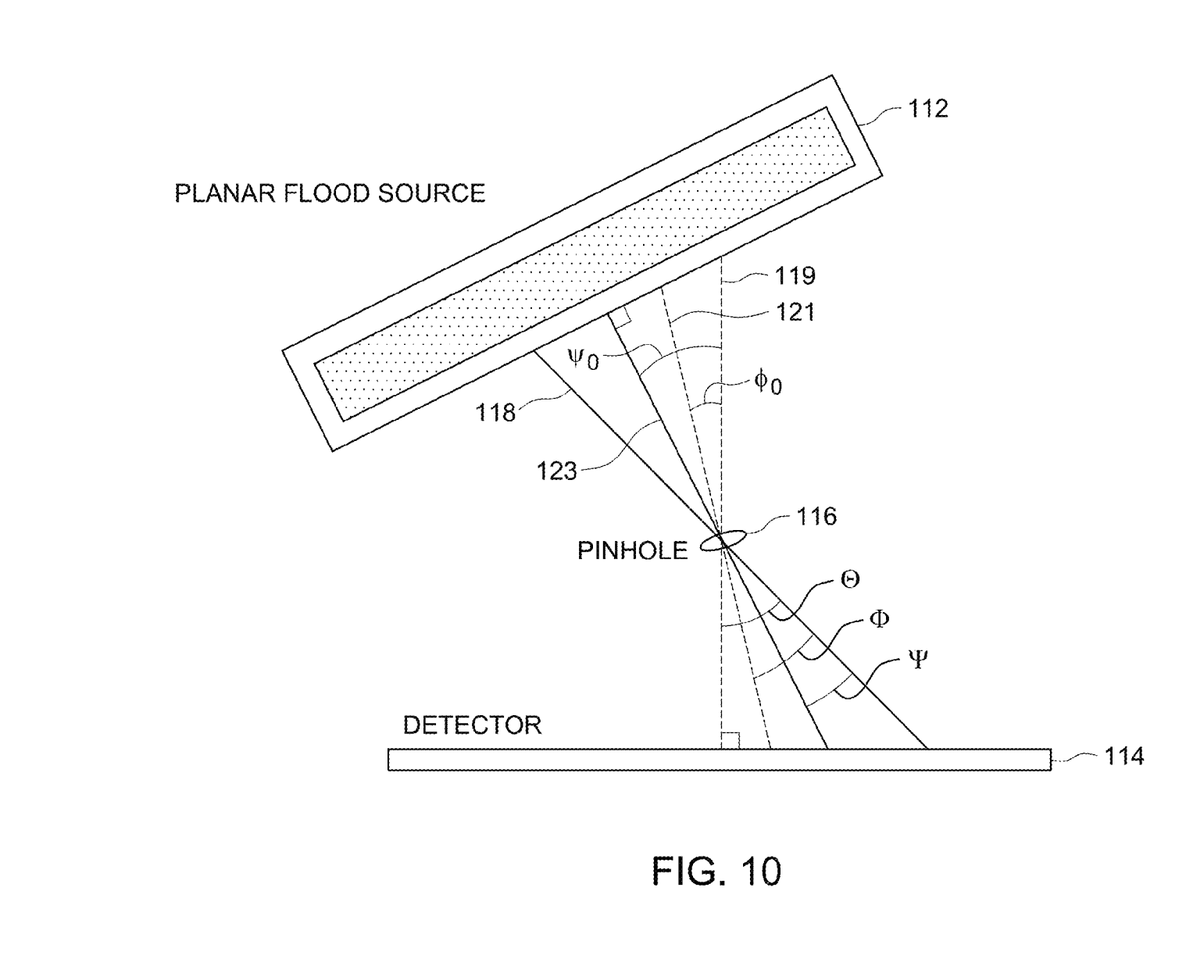
FIG. 10 is a diagram illustrating the calculation of flux density in accordance with various embodiments.

For example, the flux density I at a point P on a surface of a detector 114 can be calculated with reference to diagram illustrated in FIG. 10. The flux density may be generated from, for example, a planar flood source 112 irradiating the detector 114 through a pinhole 116 of a collimator. The flux density I may be defined as follows (if scatter and attenuation are neglected):

$$I \propto \frac{\cos^3(\Theta)\cos(\Psi)}{\cos(\Phi)}.$$

The angles $\Theta$, $\Phi$ and $\Psi$ are illustrated in the diagram. It should be noted that although FIG. 10 is shown in two dimensions, the equations also apply to three dimensions. In FIG. 10, with the flux ray illustrated as the arrow 118, a total of four different directions are considered:

the direction of the flux ray F 118;

the normal to the detector surface (illustrated by the arrow 119) $N_1$;

the normal to the pinhole (illustrated by the arrow 121) $N_2$; and the normal to the flood source (illustrated by the arrow 123) $N_3$.

The angles are then defined as follows:

$\Theta$ is the angle between the flux ray F and the normal to the detector $N_1$ $\Phi$ is the angle between the flux ray F and the normal to the pinhole $N_2$ $\Psi$ is the angle between the flux ray F and the normal to the flood source $N_3$ A simple model of attenuation of the flood source includes addition of the first exponential term as follows:

$$I \propto \frac{\cos^3(\Theta)\cos(\Psi)(a_1 e^{-\mu_1 d_1/\cos(\Psi)})}{\cos(\Phi)}$$

In the above expression, the term $\mu_1$ is the attenuation coefficient of the flood source at the energy of interest, and the term $d_1/\cos(\Psi)$ represents the typical path length traversed by radiation along flux ray F. This expression represents a linear approximation, which becomes inaccurate when the flood source activity is distributed along a thick layer relative to the attenuation coefficient of the flood source material. For example, if the flood source is made of plastic, the attenuation coefficient is around 0.12/cm and at thickness greater than 1 cm and angles Y greater than 45 degrees the approximation starts to introduce an error. Accordingly, in some embodiments, a thin source is used for calibration. However, it should be noted that the expected activity distribution can be calculated for thicker sources by integrating the above equation for all possible depths of interaction.

The above expression does not include the effect of scatter in the calibration source (e.g., phantom). As the source becomes thicker and the source is viewed at a more glancing angle, the amount of scattered radiation from the source becomes a function of angle. The scatter can be modeled by using an additional term in the intensity equation as follows:

$$I \propto \frac{\cos^3(\Theta)\cos(\Psi)(a_1 e^{-\mu_1 d_1/\cos(\Psi)} + a_2 e^{-\mu_2 d_2/\cos(\Psi)})}{\cos(\Phi)}$$

It should be noted that the exact computation of the relative coefficients $a_1$ and $a_2$, and the term $\mu_2 d_2$ may be not be provided. Accordingly, a Monte Carlo simulation may be used to generate the expected flux distribution including effects of attenuation and scatter, as well as energy resolution and window settings of the detector. Thus, the flux computed can be fitted to the above equation to determine an analytical expression for flux and used to estimate detector sensitivity.

It further should be noted that the positions and/or orientations of the calibration source 54 as provided by the calibration source holder 50 may be determined such that the gamma flux completely covers one or more of the detector components sensitive to the gamma rays. Thus, the response of a gamma-camera detector to non-uniform gamma flux is measured.

In various embodiments, the non-uniform gamma flux profile on detector component sensitive to gamma rays is modeled or calculated. For example, a model or mathematical expression of the gamma flux profile on the detector component sensitive to gamma rays may be determined that takes into account geometrical and physical characteristics of the calibration source, sensitive component of the detector, collimation system and environment. The source self-attenuation and scatter also may be taken into account in modeling. Thus, the response of the detector component sensitive to gamma rays is modeled in some embodiments. In these embodiments, the source non-uniform radiation flux is also modeled, such that a combined model of the non-uniform radiation flux and detector response creates the modeled non-uniform count density profile for a resultant image.

Figure 11:
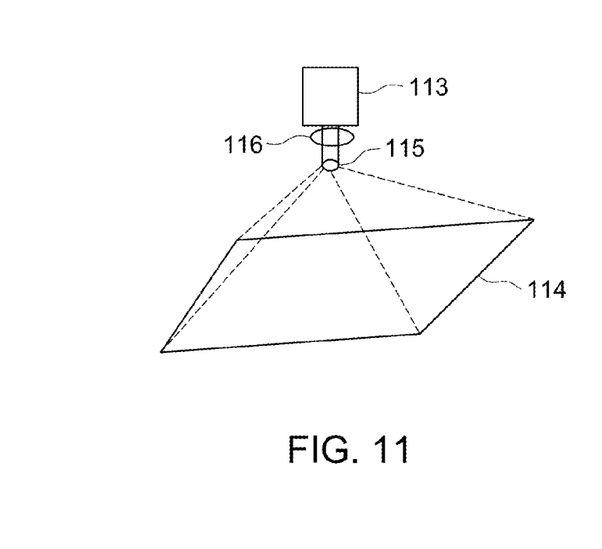
FIG. 11 is a diagram of a model for determining non-uniform source distributions in accordance with various embodiments.
Figure 12:
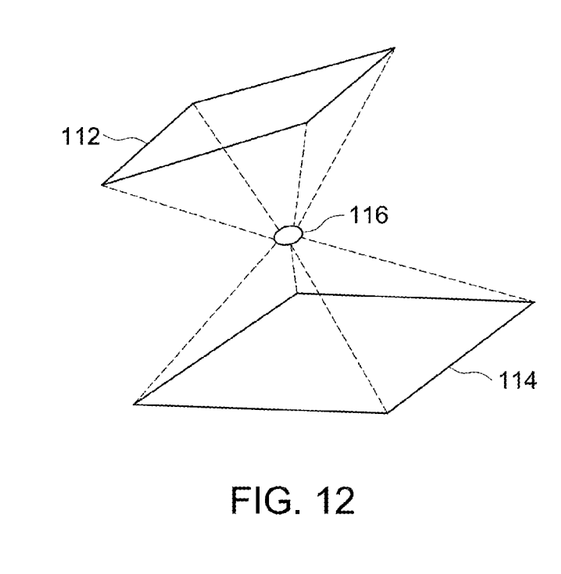
FIG. 12 is diagram of another model for determining non-uniform source distributions in accordance with various embodiments.

For example, modeling of non-uniform source distribution may be performed as illustrated in FIGS. 11 and 12. As illustrated in FIG. 11, a source holder 113 (e.g., syringe) may position a source (e.g., a point source) within the pinhole 116. In various embodiments, the model of the intensity response is expressed as follows:

$$I_{modeled} = N/r^3 \text{ where } r^2 = (x-x_0)^2 + (y-y_0)^2 + z_0^2$$

With the detector plane at $z_0=0$ and with (x,y) as the coordinates in the plane, $r=(x_0, y_0, z_0)$ are the coordinates of the point source which are known from the mechanical system design. The total counts in the calibration data acquisition is T, where N is determined by the following: $N=T/\int \partial x \partial y$.

If, for example, r is not known, the parameters $(x_0, y_0, z_0, N)$ may be regarded as a fitting parameter for a Least Squares Fit of I to the measured intensity profile. The sensitivity map (e.g., correction map) values S are then given by the following:

$$S = I_{modeled}/I_{measured} vs(x,y)$$

Figure 13:
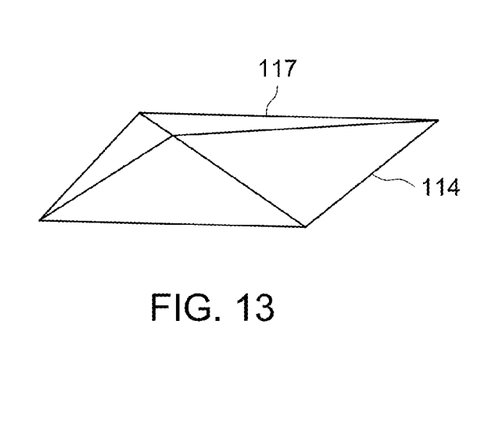
FIG. 13 is a diagram illustrating intensity response.

Referring now to FIG. 12, wherein a flat flood is represented by a point source with unknown location, the parameters $(x_0, y_0, z_0, N)$ may again be regarded as a fitting parameter for a Least Squares Fit of I to the measured intensity profile. An intensity response 117 over a detector plane (non-uniform) is illustrated in FIG. 13.

Accordingly, and referring again to FIG. 1, at 36 a modeled or calculated non-uniform count density profile is determined based on the modeled or calculated non-uniform radiation flux and the modeled or calculated response of the detectors.

When the source position is known exactly, the angle $\Psi$ can be calculated from the geometry. However, when the source position is not known exactly, for example when the source is positioned on a table, using a robotic attachment, or using any method other than the fixed source holder (such as the calibration source holder 50), then the orientation of the flood source is computed before calculating the expected flux distribution. This calculation can be performed using the intensity equation described above while noting that the angle is the difference between the ray F and the flood normal $N_3$. An optimization routine can be used, for example, to determine the direction of $N_3$ that minimizes the error of fit between the calculated flux and the observed flux, after which the calculated flux can be used to determine the residual error in the detector and thus determine the detector sensitivity map as described in more detail below.

It should be noted that the modeling is performed when the calibration flux is non-uniform. However, the various embodiments also may be implemented using a uniform calibration source. In such embodiments, the count density profile is not determined from modeling, but instead using a simpler closed form expression or equation.

It also should be noted that an image comparison alternatively may be performed. For example, in accordance with some embodiments, a previous flood image may be compared to a current flood image to determine if there is correct alignment. Thus, the comparison of the measured non-uniform radiation flux information may be compared to a model, a mathematical equation or a known alignment. Thereafter, a correction may be performed or the misaligned calibration source physically moved, for example, by moving the gantry of the NM imaging system.

Thereafter, a uniformity correction map is derived at 38 from the measured and modeled or calculated non-uniform count density profiles. The uniformity correction map may be based on any type of comparison of the measured and modeled or calculated non-uniform count density profiles. For example, a simple subtraction process on a pixel by pixel basis may be performed to calculate the uniformity correction map. In some embodiments, the uniformity correction map is determined from a ratio of the measured and modeled or calculated non-uniform count density profiles, for example, a ratio of the count values.

The data derived from the measured and modeled or calculated non-uniform count density profile is essentially a measure of the detector non-uniformity of response to gamma flux and forms the uniformity correction map. The uniformity correction map then may be applied to subsequent image scans at 40, for example, used during clinical NM scans to correct for image non-uniformities, or is applied during image reconstruction as part of the system model.

Thus, the modeled or calculated non-uniform gamma flux profile is used to determine the gamma-camera detector measurement inaccuracy to gamma flux. The gamma-camera uniformity correction map is derived from the measured and modeled or calculated non-uniform count density profile.

Thus, in accordance with various embodiments, a uniform flood source can be used to create non-uniform gamma flux, which irradiates the detector components sensitive to gamma rays. Multiple source positions that are predefined by the calibration source holder 50 may be used to irradiate all the detector components sensitive to gamma rays, for example, separately irradiate entire detector components.

For a multiple detector system equipped with a multiple collimation system, a number of pre-defined positions and orientations of the calibration source may be used. The non-uniform count density profile is then measured and modeled or calculated for each combination of the calibration source position and detector. The calibration source positions as defined by the calibration source holder 50 provide gamma flux from the calibration emission source that completely covers all the detector components sensitive to gamma rays for a particular detector. In the various embodiments, the calibration source positions are provided to reduce or minimize the number of repositionings for entire system calibration.

It should be noted that multiple calibration sources can be used for a multiple detector system. It also should be noted that the uniformity correction of the various embodiments also can be applied to gamma camera systems wherein an existing method based on uniform gamma flux is used. It should further be noted that other methods may be used for positioning the calibration source in one or more positions. For example, the source can be placed on the patient table and the detectors moved relative to this source, or the source can be held on a robotic positioning device and moved to multiple positions relative to the detector.

The various embodiments providing gamma camera uniformity correction may be used in connection with different types of imaging systems, such as the NM imaging system 80 shown in FIGS. 7 and 9 having collimated pixelated detectors, such as CZT detectors to detect event counts (e.g., SPECT photon counts). For example, as shown in FIG. 7, the NM imaging system 80 may be a diagnostic NM imaging system 80, which is shown embodied as a SPECT imaging system, such as the Discovery NM 530*c* imaging system available from GE Healthcare. The system 80 includes the gantry 82 (which may be an integrated gantry) having the bore 84 therethrough. The gantry 82 is configured to support one or more NM radiation detectors forming part of the detector assembly 86. The radiation detectors may be configured as CZT imaging modules, for example, CZT solid state detectors having focused collimation provided by a plurality of collimators. It should be noted that the NM radiation detectors may be supported around more or less of the gantry 82, for example, around the entire 360 degrees of the gantry 82 or a portion thereof, such as 180 degrees of the gantry 82. Thus, the radiation detectors are arranged around the bore 84 defining an examination axis.

A patient table 88 may be provided and includes a bed 90 slidingly coupled to a bed support system 92, which may be coupled directly to a floor or may be coupled to the gantry 82 through a base coupled to the gantry 82. The bed 90 may include a stretcher slidingly coupled to an upper surface of the bed 90. The patient table 88 is configured to facilitate ingress and egress of a patient (not shown) into an examination position that is substantially aligned with the examination axis of the bore 84. During an imaging scan, the patient table 88 may be controlled to move the bed 90 and/or stretcher axially into and out of (as well as upward and downward within) the bore 84 to obtain event count information for the patient or a region of the patient. The operation and control of the imaging system 80 may be performed in any manner known in the art. It should be noted that the various embodiments may be implemented in connection with imaging systems that include stationary gantries or moving gantries.

The NM imaging system 80 also includes a processor 104 (e.g., workstation) that is coupled to the imaging system 80 as shown in FIG. 9. During operation, the output from the detectors 100, which may be one or more image data sets 106 (or other image information such as non-uniform radiation flux information), is transmitted to the processor 104 for processing, such as image reconstruction to form an image for display on a display 110 or for detector calibration and/or for generating uniformity correction maps as described in more detail herein.

Thus, for example, event count information, such as photon count information or non-uniform radiation flux information from the emissions of the calibration source 54 within the calibration source holder 50 mounted within the detector assembly 86 by the support member 52 is obtained from the detectors 100. It should be noted that the raw data, such as the image data sets 106, may be stored for a short term (e.g., during processing) or for a long term (e.g., for later offline retrieval) in a memory 108. The memory 108 may be any type of data storage device, which may also store databases or maps of information. The memory 108 may be separate from or form part of the processor 104.

The calibration source holder 50 is configured such that the calibration source 54 is positioned in front of a portion of the detector assembly 86, such as positioning the planar surface of the calibration source 54 in front of one or more of the collimators 102 (e.g., exposing one or all of pinholes to radiation) on one side of the detector assembly 86 to illuminate an entire detector 100. The calibration source holder 50 is then moved to expose the collimators 102 on the lower portion of the detector assembly 86 (e.g., bottom side (horizontal wall) as illustrated in FIG. 9).

Figure 14:
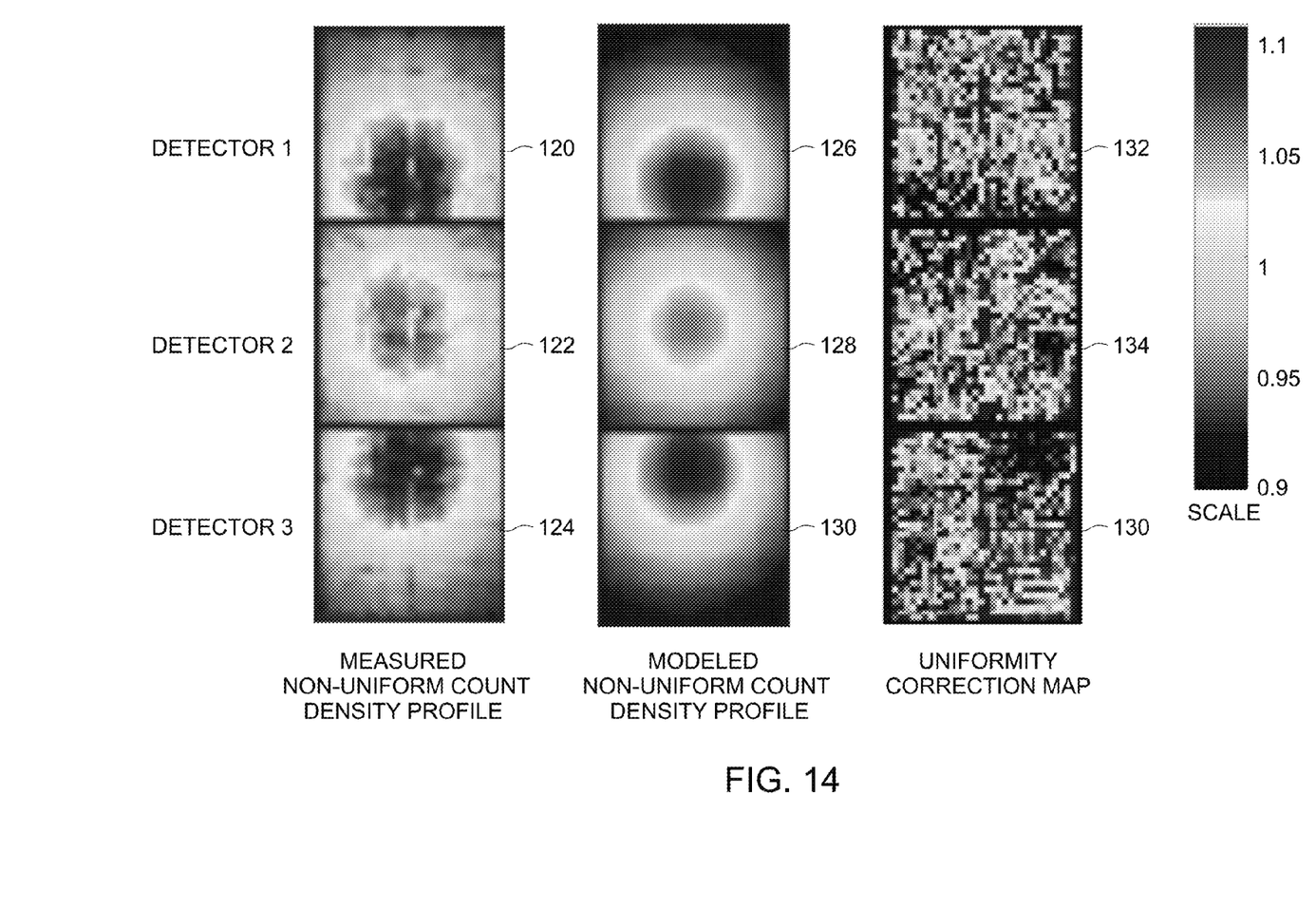
FIG. 14 is a diagram illustrating a calibration process in accordance with various embodiments.

Thus, in accordance with various embodiments, gamma camera uniformity correction may be performed based on spatially determined non-uniform gamma flux as illustrated in FIG. 14. Images 120, 122 and 124 correspond to measured non-uniform count density profiles for three detectors (Detectors 1, 2 and 3). In accordance with various embodiments, a non-uniform count density profile is modeled or calculated as illustrated by the images 126, 128 and 130 for the measured non-uniform count density profiles shown in images 120, 122 and 124, respectively. Using the measured and modeled or calculated non-uniform count density profiles, uniformity correction maps 132, 134 and 136 are derived as described in more detail herein.

It should be noted that the various embodiments may be implemented in hardware, software or a combination thereof.

The various embodiments and/or components, for example, the modules, or components and controllers therein, also may be implemented as part of one or more computers or processors. The computer or processor may include a computing device, an input device, a display unit and an interface, for example, for accessing the Internet. The computer or processor may include a microprocessor. The microprocessor may be connected to a communication bus. The computer or processor may also include a memory. The memory may include Random Access Memory (RAM) and Read Only Memory (ROM). The computer or processor further may include a storage device, which may be a hard disk drive or a removable storage drive such as a floppy disk drive, optical disk drive, and the like. The storage device may also be other similar means for loading computer programs or other instructions into the computer or processor.

As used herein, the term "computer" or "module" may include any processor-based or microprocessor-based system including systems using microcontrollers, reduced instruction set computers (RISC), ASICs, logic circuits, and any other circuit or processor capable of executing the functions described herein. The above examples are exemplary only, and are thus not intended to limit in any way the definition and/or meaning of the term "computer".

The computer or processor executes a set of instructions that are stored in one or more storage elements, in order to process input data. The storage elements may also store data or other information as desired or needed. The storage element may be in the form of an information source or a physical memory element within a processing machine.

The set of instructions may include various commands that instruct the computer or processor as a processing machine to perform specific operations such as the methods and processes of the various embodiments of the invention. The set of instructions may be in the form of a software program. The software may be in various forms such as system software or application software. Further, the software may be in the form of a collection of separate programs or modules, a program module within a larger program or a portion of a program module. The software also may include modular programming in the form of object-oriented programming. The processing of input data by the processing machine may be in response to operator commands, or in response to results of previous processing, or in response to a request made by another processing machine.

As used herein, the terms "software" and "firmware" are interchangeable, and include any computer program stored in memory for execution by a computer, including RAM memory, ROM memory, EPROM memory, EEPROM memory, and non-volatile RAM (NVRAM) memory. The above memory types are exemplary only, and are thus not limiting as to the types of memory usable for storage of a computer program.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the invention without departing from their scope. While the dimensions and types of materials described herein are intended to define the parameters of the various embodiments of the invention, the embodiments are by no means limiting and are exemplary embodiments. Many other embodiments will be apparent to those of skill in the art upon reviewing the above description. The scope of the various embodiments of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

This written description uses examples to disclose the various embodiments of the invention, including the best mode, and also to enable any person skilled in the art to practice the various embodiments of the invention, including making and using any devices or systems and performing any incorporated methods. The patentable scope of the various embodiments of the invention is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal languages of the claims.

What is claimed is:

1. A method for calibrating a nuclear medicine (NM) imaging system, the method comprising:
    acquiring spatially determined non-uniform radiation flux information from a calibration scan of a calibration source using a gamma camera having an attached non-parallel-hole collimator;
    determining a measured non-uniform count density profile from the acquired non-uniform radiation flux information; and
    creating a gamma camera uniformity correction map derived from (i) the measured non-uniform count density profile and (ii) a modeled or calculated non-uniform count density profile for calibrating the NM imaging system by comparing the measured non-uniform count density profile to the modeled or calculated non-uniform count density profile.

2. A method in accordance with claim 1 further comprising using a calibration source holder to position the calibration source in a plurality of predetermined positions and orientations.

3. A method in accordance with claim 2 wherein an entire detector surface is irradiated by the calibration source when in the predetermined position and orientation.

4. A method in accordance with claim 1 further comprising modeling a non-uniform radiation flux profile and a response of a detector of the NM imaging system to the non-uniform radiation flux to determine the modeled non-uniform count density profile.

5. A method in accordance with claim 4 wherein the modeling of the non-uniform radiation flux profile includes a plurality of factors including geometrical and physical characteristics of at least one of the calibration source, sensitive component of a detector of the NM imaging system, collimation system or environment.

6. A method in accordance with claim 4 further comprising estimating the position of the calibration source from the measured non-uniform count density profile.

7. A method in accordance with claim 4 further comprising estimating a new position or a representative position of the calibration source from the measured non-uniform count density profile.

8. A method in accordance with claim 4 wherein the non-uniform count density profile is modeled or calculated for each combination of a plurality of calibration source positions and detector of the NM imaging system.

9. A method in accordance with claim 1 wherein the calibration source comprises a uniform flood source.

10. A method in accordance with claim 1 wherein the fixed non-parallel-hole collimator comprises one of a pinhole collimator, a fan-beam collimator, a varifocal collimator, an astigmatic collimator, a slant-hole collimator, a multi-segment slant-hole collimator, a slatted collimator, a slit-slat collimator or a cone-beam collimator.

11. A method in accordance with claim 1 wherein the fixed non-parallel-hole collimator comprises one of a pinhole collimator system or a multi-pinhole collimator system.

12. A method for generating a gamma-camera correction map, the method comprising:
   acquiring non-uniform radiation flux information from a calibration scan of a calibration source from a gamma camera having a fixed non-parallel-hole collimator using a calibration source holder, wherein the calibration source holder includes a plurality of predetermined fixed calibration source positions and orientations;
   determining a gamma-camera uniformity correction using measured non-uniform gamma flux from the non-uniform radiation flux information and modeled or calculated non-uniform gamma flux; and
   creating the gamma-camera correction map from the (i) measured non-uniform gamma flux and (ii) the modeled or calculated non-uniform gamma flux.

13. A method in accordance with claim 12 wherein the gamma-camera correction map comprises a uniformity correction map.

14. A method in accordance with claim 12 further comprising performing sensitivity calibration of a nuclear medicine (NM) imaging system using the gamma-camera correction map.

15. A method in accordance with claim 12 further comprising using a uniform flood source to create the non-uniform gamma flux.

16. A method in accordance with claim 15 wherein the uniform flood source comprises $^{57}$Co.

17. A method in accordance with claim 12 wherein the fixed non-parallel-hole collimator comprises one of a pinhole collimator, a fan-beam collimator a varifocal collimator, an astigmatic collimator, a slant-hole collimator, a multi-segment slant-hole collimator, a slatted collimator, a slit-slat collimator or a cone-beam collimator.

18. A method in accordance with claim 12 wherein the non-uniform gamma flux is modeled or calculated for each combination of a plurality of calibration source positions and detector of a nuclear medicine (NM) imaging system.

19. A nuclear medicine (NM) imaging system comprising:
   at least one gamma camera;
   a calibration source holder configured to position a calibration source in a plurality of positions and orientations relative to the gamma camera to acquire non-uniform radiation flux information from a calibration scan of a calibration source by the gamma camera; and
   a processor configured to determine a gamma-camera uniformity correction map for the gamma camera using (i) measured non-uniform gamma flux from the gamma camera and (ii) modeled or calculated non-uniform gamma flux by comparing the measured non-uniform gamma flux to the modeled or calculated non-uniform gamma flux.

20. An NM imaging system in accordance with claim 19 wherein the calibration source comprises a uniform flood source.

* * * * *